Sept. 7, 1926.
A. L. TODD
1,598,625
CULTIVATING DISK
Filed May 23, 1924
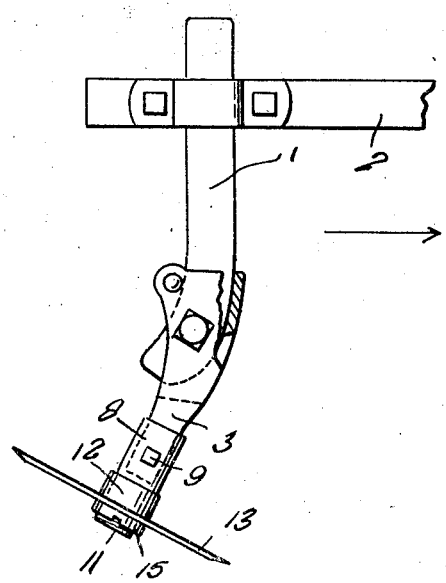
Fig. 1.
Fig. 2.
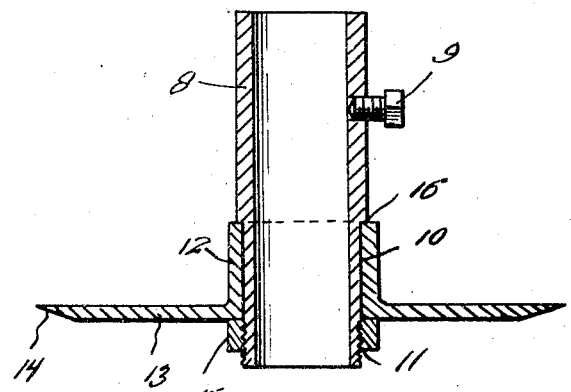
Arthur L. Todd,
Inventor
By Clarence A. O'Brien
Attorney Patented Sept. 7, 1926.

1,598,625

UNITED STATES PATENT OFFICE.

ARTHUR L. TODD, OF LA GRANGE, ILLINOIS.

CULTIVATING DISK.

Application filed May 23, 1924. Serial No. 715,414.

This invention relates to new and useful improvements in agricultural implements and has for its principal object to provide a rotary cultivator disk which is adapted to remove growing weeds in such a manner as to prevent the clogging of the disk.

A further object of the invention is to provide a rotary cultivator disk of the above mentioned character, which is adapted to be removably supported on the lower end of a cultivator foot in such a manner as to have a portion thereof working below the surface of the earth, the provision of a rotary cutter disk preventing the weeds or stalks from collecting on the disk.

A still further object of the invention is to provide a rotary cultivator disk of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals desigate like parts throughout the same:

Figure 1 is a side elevation of the cultivator disk showing the same supported on the lower end of a cultivator foot.

Figure 2 is a vertical sectional view through the tubular member showing the manner in which the cutter disk is supported on the lower end thereof.

In the drawing wherein for the purpose of illustration is shown the preferred embodiment of my invention, the numeral 1 designates a cultivator foot which is supported on the cultivator frame 2 in the usual manner.

A shank 3 is attached to the foot 1.

Adapted to be detachably supported on the shank portion 3 is the tubular member 8 and a set screw such as is illustrated at 9 is associated therewith whereby the same may be supported on the lower end of the disk supporting shank 3. The lower portion of the tubular member 8 is reduced as illustrated at 10 and the reduced portion is provided with the externally threaded end 11 as clearly illustrated in Figure 2. Adapted to be removably supported on the reduced portion 10 of the tubular member 8 is the hub portion 12 of a suitable cultivator disk 13, the outer edge of which is sharpened as illustrated at 14 and the disk is adapted for rotary movement of the reduced portion 10 of the tubular member.

For the purpose of supporting the rotary disk of the tubular member I provide the lock nut 15 which is threaded on the externally threaded end 11 and engages the under face of the disk 13 while the upper edge of the hub portion 12 engages the shoulder 16 formed by the reduced portion 10. This construction is clearly illustrated in Figure 2 of the drawing.

With the parts arranged as shown in Figure 1 of the drawing, the cultivator travels in the direction of the arrow and a portion of the disk will be disposed below the surface of the earth and will come in contact with the roots of weeds and stalks and the cutting edge 14 of the disk will sever the same from the ground. The provision of the rotary cutter disk further prevents the collection of the roots of stalks and weeds on the disk and will efficiently exterminate growing weeds which are in the path of the cutter disk. Heretofore the cultivator shovels now in use are pointed and oftentimes the weeds will not be cut by the cutting edges of the pointed cultivator shovels but will be bent downwardly and left growing.

With a rotary cultivator disk of the above mentioned character, all of the weeds which come in contact with the disk will be cut and the disk cannot possibly become clogged with the weeds or stalks.

The simplicity of my device enables the same to be manufactured at a very low cost and the parts are further so arranged as to enable the same to be readily disassembled whenever desired.

Furthermore a cultivator disk of the above mentioned character, will be strong and durable.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In combination, a tubular member for disposition over the end of a shank, a set screw passing through the tubular member to engage the shank, one end of said tubular member being reduced and having threads adjacent the terminal of its reduced end and providing a shoulder intermediate its ends, a rotary disk having a hub rotatable on the reduced end, and a nut engaged with the threaded portion of the reduced end to hold the hub on said reduced end against the shoulder.

In testimony whereof I affix my signature.

ARTHUR L. TODD.